July 9, 1963 L. J. BAUGER ETAL 3,096,954
IMPROVEMENTS TO JET-PROPELLED AIRCRAFT WITH DIRECTIONAL
DISCHARGE-NOZZLES FOR VERTICAL TAKE-OFF
Filed Nov. 6, 1961 4 Sheets-Sheet 1
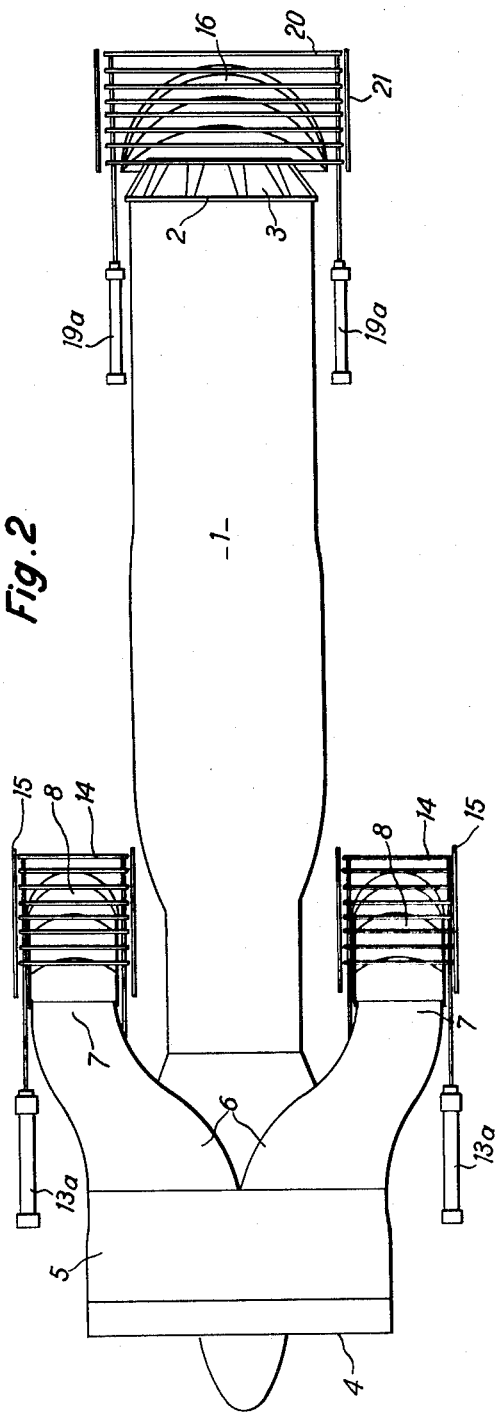
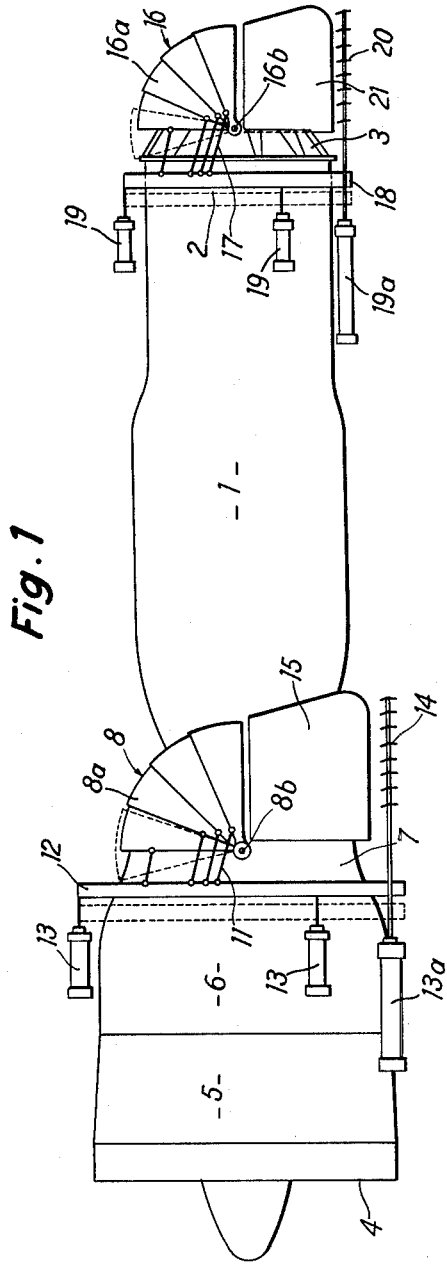
INVENTORS,
Louis Jules Bauger
René Constant
Louis Francois Jumelle
BY Watson, Cole, Grindle + Watson,
ATTORNEYS

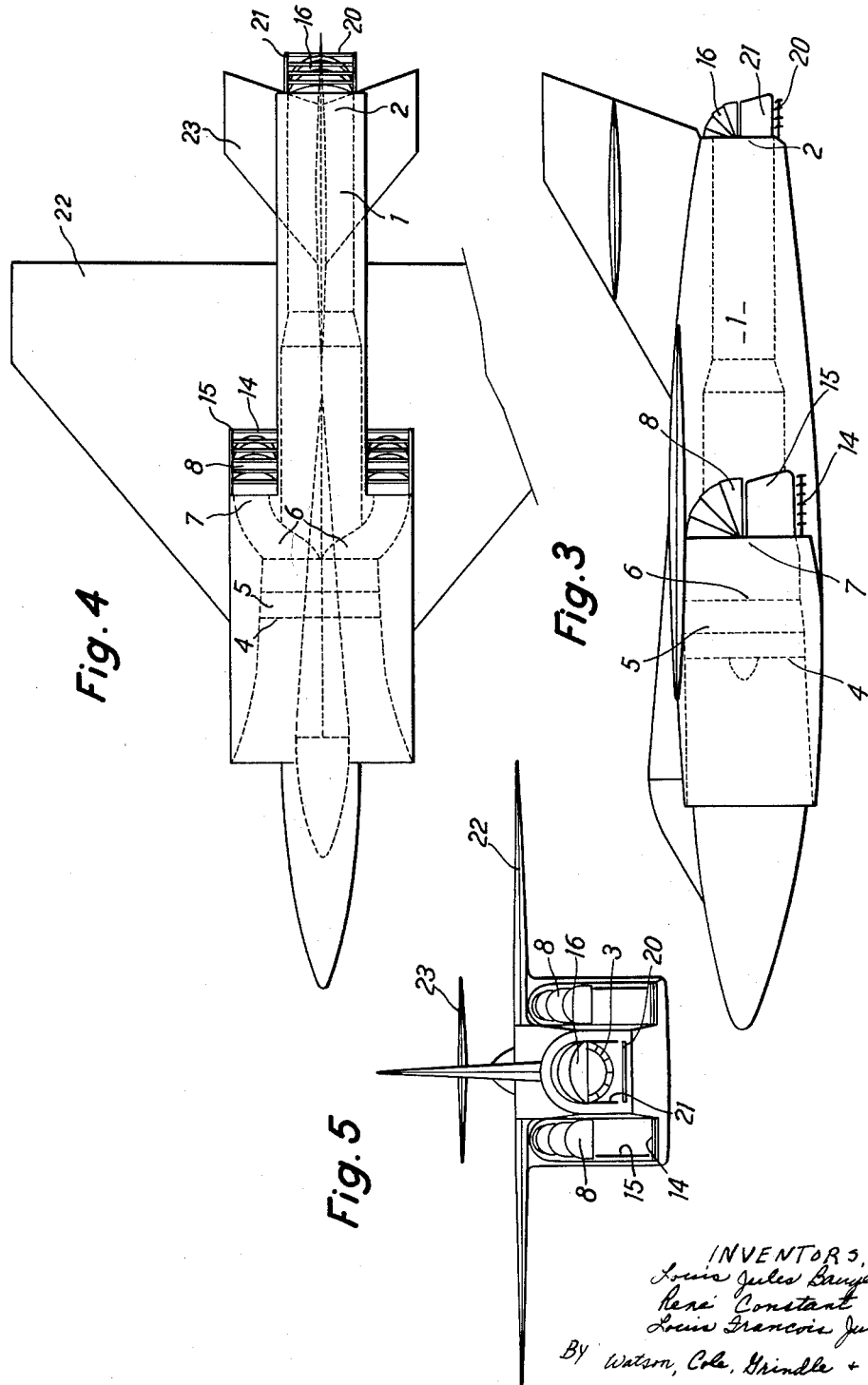

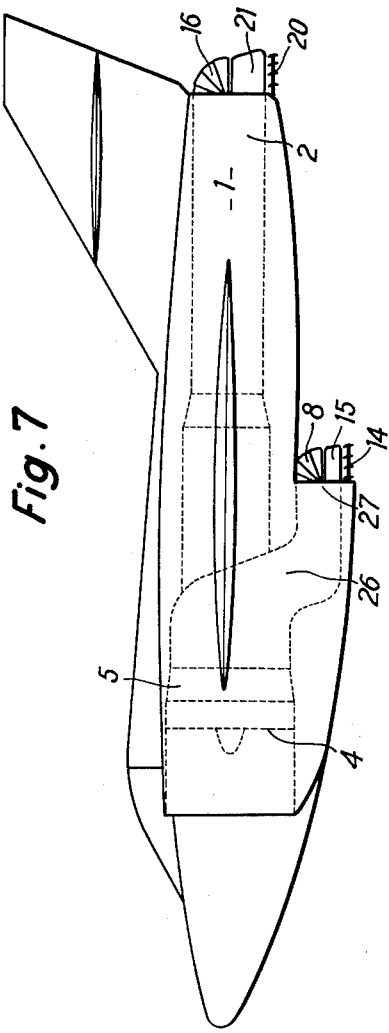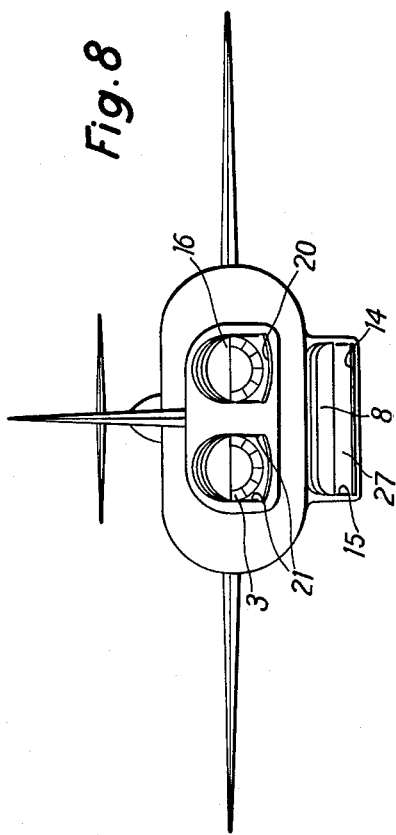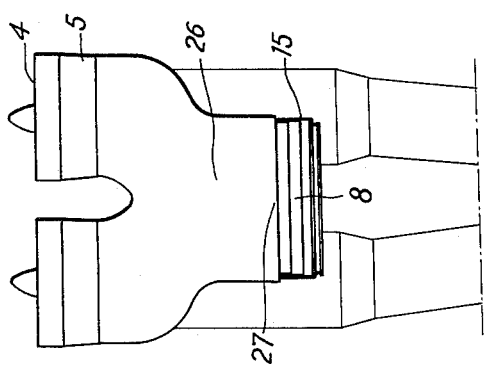

3,096,954
IMPROVEMENTS TO JET-PROPELLED AIRCRAFT WITH DIRECTIONAL DISCHARGE - NOZZLES FOR VERTICAL TAKE-OFF
Louis Jules Bauger, Vanves, René Constant, La Rochette, and Louis François Jumelle, Paris, France, assignors to Societe Nationale d'Etude et de Construction de Moteurs d'Aviation, Paris, France, a company of France
Filed Nov. 6, 1961, Ser. No. 150,500
Claims priority, application France Nov. 10, 1960
6 Claims. (Cl. 244—23)

The continual increase in speeds of flight necessitates a corresponding increase in engine thrust, and as the development of double-flow reactors results in an increase in the static value of this thrust, reactors have been constructed which develop a thrust greater than the weight of the aircraft, which has made it possible to consider the vertical take-off and landing of the aircraft, the latter being currently referred to in this case by the initials V.T.O.L. (Vertical Take-Off and Landing). Amongst the V.T.O.L. can be distinguished those which land on the tail and swing forwards in order to pass to horizontal flight, and those which carry out their evolutions without changing trim, by simple orientation of the reaction jets.

The invention relates to turbo-reactors with double flow, in particular those which are known as turbo-fans intended to equip V.T.O.L. aircraft without changing trim, and more particularly, amongst these engines, those which have an external flow compressor located at the front. The invention consists in combining the said engines with discharge-nozzles intended to deflect their flows totally and separately in the hot and cold state, the nozzles being formed of one or several pivoted parts. The said variable discharge-nozzles permit the orientation, progressive as may be required, of the jets of gas from the axial direction of their outlet base in the engine up to a direction substantially perpendicular and vertical.

While the most simple form of embodiment of the invention utilizes a single engine provided with jet deflecting devices both at the outlet of the low-pressure compressor and at the rear of the discharge-nozzle of the high-pressure flux, other forms are given as alternatives, enabling several combined engines and nozzles to be incorporated to the best advantage in the structure of the cell.

The description which follows below with reference to the accompanying drawings (which are given by way of example only and not in any limitative sense) will make it quite clear how the invention may be carried into effect, the particular features which are brought out either in the text or in the drawings being understood to form a part of the said invention.

FIGS. 1 and 2 show views in elevation and in bottom plan, respectively, of a turbo-fan fitted with three jet deflecting devices, two at the sides and one at the rear.

FIGS. 3, 4 and 5 are views in elevation, in bottom plan and from the rear, respectively, of a V.T.O.L. single-engine aircraft constructed in accordance with the invention.

FIGS. 7, 8 and 9 show a two-engine V.T.O.L. aircraft having a ventral cold-flow nozzle common to the two turbo-fans, shown respectively in elevation, from the rear and from below (in the latter case with the engine assembly only).

Figure 6:
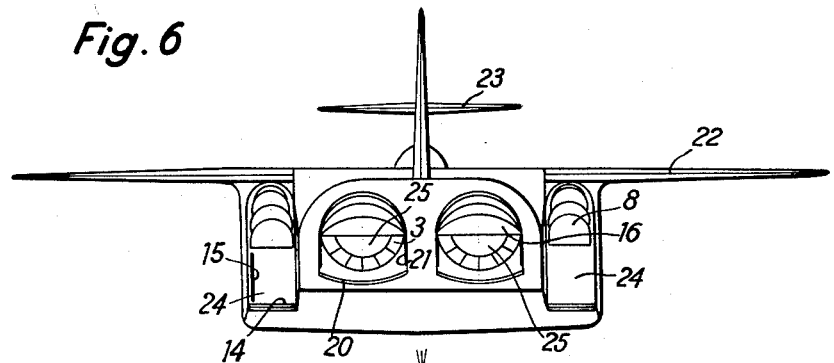
FIG. 6 shows a V.T.O.L. two-engine aircraft seen from the rear and comprising two lateral nozzles with a cold flow.

In FIGS. 1 and 2 is shown a turbo-reactor, in which the body 1 is terminated towards the rear by a discharge-nozzle 2 for the hot gases. This nozzle is provided with devices permitting its section to be regulated, in the present example, by means of multiple flaps 3. An air intake 4 of substantial diameter supplies an axial compressor housed in a front cowling 5. The air thus compressed is divided into two flows, one of which passes through the body 1 to pass out through the nozzle 2, while the other passes directly out of the front cowling 5 so as to supply an auxiliary thrust. To this end, it is brought by a collector 6 to two lateral nozzles 7 which direct it parallel to the axis of the engine.

According to the invention, the collector 6 has a short and straight outline, and the nozzles 7 are fitted with jet deflecting devices 8. The latter are composed of deflecting parts 8a, the shape of spherical lunes, each being articulated along the axis 8b which is the diameter common to the border great circles of said lunes. Their position in normal flight (shown in dotted lines) is retracted towards the front, and they are then folded one into the other. In stationary flight, these parts 8a are spread out on a spherical surface. More generaly, this surface may include a toric part, the meridian of which may be any kind of line, for instance, a rectangular line with rounded corners.

It is not necessary for this surface to be one of revolution, and the section of the deflecting parts 8a by the plane of symmetry may be a rectilinear or curved line instead of a circular arc.

The axes of the deflecting parts may coincide as shown, or be distinct.

The parts 8a are coupled by rods 11 to a ring 12 surrounding the nozzle 7, the ring being in turn guided and actuated by jacks 13. This unit is completed by:

A grid 14 provided with transverse blades and arranged under the parts 8a when they are unfolded, the said grid being substantially horizontal. This grid is retracted in normal flight by means of jacks 13a, associated to jacks 13, in order not to produce any troublesome drag, either internal or external;

Lateral partitions 15, substantially vertical, which may be withdrawn in normal flight.

The discharge-nozzle 2 for the hot gases is also provided with a jet deflecting device comprising corresponding members of similar shape, and of dimensions adapted to the flow-rate, more especially made of material which withstands high temperatures. The parts 16a are articulated on the shaft 16b. The rods 17 couple the parts 16a to the ring 18, actuated by the jacks 19. A grid of blades 20 and lateral partitions 21 are also provided.

In order to facilitate the placing of the turbo-fan in position in the cell, and by reason of the substantial overall size of the front portion of the engine, it is necessary to provide rapid fixing flanges (not shown) on the outlet orifices of the cold flow, permitting first of all the mounting of the bare turbo-fan, the discharge-nozzles being added and fixed subsequently.

The operation of the device described above, and incorporated in an aircraft, is as follows:

When taking-off, or more generally in the position of lift by reaction, the turbo-fan engine develops a total thrust at least equal to the weight of the aircraft, shown for instance in FIGURES 3 and 5, and the distribution of the flows amongst several discharge-nozzles enables the said thrust to be applied at the centre of gravity of the aircraft. The jacks 13 are fully extended and the parts 8a are opened out by means of the rods 11 and the ring 12. The air flow, compressed at 5 and brought by the collector 6 to the lateral nozzles 7, is deflected downwards by the jet deflecting devices 8. The blades of the grids 14 complete this deflection, the jacks 13a being also extended, and the lateral partitions 15 prevent the lateral spread of the jet and the losses which reduce the lifting thrust. The walls of the fuselage may be given a shape such that they replace these partitions towards the interior; as the flow is at low temperature, there are no great precautions to be taken with regard to the heat resistance of the materials.

The jacks 19 are also in the position of maximum tension, and the parts 16a are opened out by means of the rods 17 and the ring 18. The flow of gas at high temperature discharged from the nozzle 2 is deflected downwards by the jet deflecting device 16. The blades of the grid 20 complete this deflection, the jacks 19a being in extension, and the partitions 21 preventing the lateral spread of the jet.

It is possible to distribute the impulses due to the three discharge nozzles, since on the one hand the movable flaps 3 have an action on the ratio of the cold and hot flows and since on the other hand the parts of each jet deflecting device can be operated separately if so desired. It is also possible, for the purposes of braking or stabilization, for the deflected jet to pass beyond the vertical and to be directed towards the front.

Without departing from the scope of the invention, it would also be possible to actuate the grids of blades 14 and 20 and the partitions 15 and 21 by the rings 12 and 18.

The transmission from the left phase to the propulsion phase can be obtained by progressive withdrawal of the parts of the jet deflecting device, the value of the thrust being adjusted accordingly, when so required.

During normal flight, the lift can be produced by the wings 22 shown in FIGS. 4, 5 and 6, and the pitching control is effected by a horizontal rudder 23. The jet deflecting devices and the grids of blades are then withdrawn towards the front by the action of the jacks 13, 13a and 19, 19a. Their position is shown in dotted lines in FIG. 1. The cold and hot flows are discharged towards the rear and the direction of the thrust is substantially coincident with the axis of the turbo-fan. The walls of the fuselage, if these are employed as the partitions, are passed over by the cold flows and produce slight losses in thrust. These losses, taken into account from the propulsion point of view, are however partly compensated in the whole unit by the blowing effect on the boundary layer, which is an improvement from the point of view of the cowling drag.

In the case of a two-engine V.T.O.L. aircraft shown in FIGS. 6, 7, 8, 9, 10 and 11, a number of combinations of nozzles and engines are possible.

Figure 11:
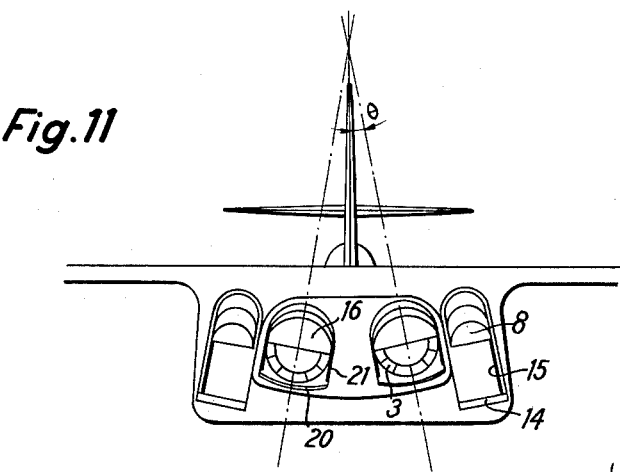

FIGS. 6 and 11 show a view from the rear of a two-engine aircraft provided with four nozzles fitted with jet deflecting devices, each turbo-fan supply a side nozzle 24 with a cold flow and a rear discharge-nozzle 25 with a hot flow. The parts employed are of the same kind as those provided on the single-engine type described above and have been marked with the same reference numbers.

FIGS. 7, 8, 9 and 10 also show a two-engine aircraft provided with three nozzles fitted with jet deflecting devices. The cold air compressors supply in common a collector 26 which brings the air to a single ventral nozzle 27. Accordingly, one part only of the total thrust is applied out of the central part of the aircraft. This is advantageous from the point of view of stability in the event of a difference between the thrusts of the two turbo jet engines.

It would alternatively be possible to utilize a lateral outlet of cold flow towards the exterior of the aircraft for each motor, joined to a common ventral outlet.

Figure 10:
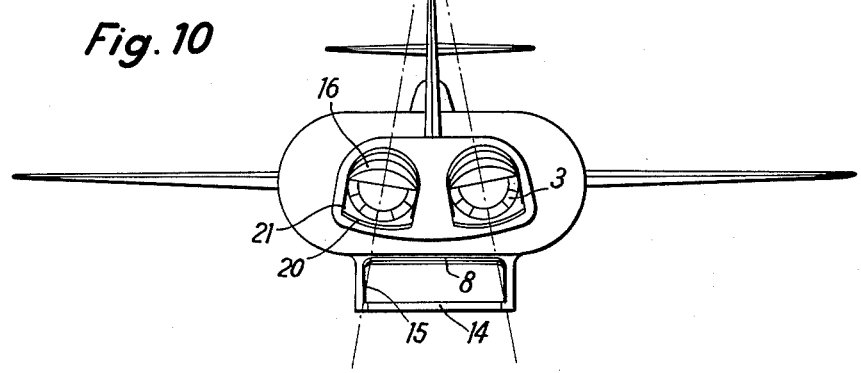
FIGS. 10 and 11 show a view from the rear of a two-engine aircraft provided with discharge-nozzles for the cold-flow and the hot-flow, slightly inclined with respect to the vertical.

In order to take advantage of the increased safety resulting from the use of more than one engine, the possible unbalance due to the failure of a reactor may be reduced by a slight inclination of the jet deflecting device such as shown in FIGS. 10 and 11, and corresponding to an angle $\theta$. This enables the rolling unbalance to be reduced in case of failure of a reactor, at the cost of a slight reduction in the lifht thrust, the loss per unit of thrust being $(1-\cos \theta)$. The lateral thrust in normal flight remains unchanged.

The control of the aircraft thus remains possible in the case of failure of an engine and permits an emergency landing to be made. There is no longer to be feared an abrupt overturning which would even prevent the pilot from actuating his ejection seat.

The choice between these various arrangements depends on an examination of the performances and of the difficulties of construction. The form and the section of the discharge-nozzles will be selected so as to facilitate construction, the behaviour of their constituent parts and their installation in the cell.

It will of course be understood that while remaining within the scope of the present invention, the above-described reactors may be employed in other types of installation of engines on aircraft. For example, a multi-reactor comprising engines in nacelles can be produced advantageously with the engines according to FIGS. 1 and 2. A multi-reactor comprising engines housed in nacelles in pairs could advantageously be constructed with engines according to FIGS. 6 and 11, always by way of example.

What we claim is:

1. In an aircraft which takes off vertically without changing trim, the jet deflecting combination of at least one turbojet engine having a double flow and a front fan, comprising a rear discharge nozzle for the hot flow and at least one nozzle discharging the flow compressed by said fan, immediately downstream of said fan, with jet deflecting devices associated with each discharge nozzle and comprising, arranged immediately downstream of said nozzle, at least one upper deflecting segment pivoted about an axis substantially horizontal, substantially vertical lateral partitions, substantially horizontal lower grids provided with transverse blades and a common actuating mechanism for urging in the same time said segment, partitions and grids from a retracted to an extended position and vice versa.

2. An aircraft according to claim 1, in which said front fan supplies two discharge-nozzles arranged on each side of the aircraft.

3. An aircraft according to claim 1, in which the front fans of two turbo-jet engines supply in common a single discharge-nozzle arranged on the ventral portion of said aircraft.

4. An aircraft according to claim 1, in which the front fans of two turbo-jet engines each supply a discharge-nozzle disposed on a side of the aircraft.

5. An aircraft according to claim 1, in which the jet deflecting devices associated with several engines are given a certain lateral inclination, so as to reduce the rolling couple creating an unbalance in the case of possible failure of an engine.

6. In an aircraft which takes off vertically without changing trim, the jet deflecting combination of at least one turbojet engine having a double flow and a front fan, comprising a rear discharge nozzle for the hot flow and at least one nozzle discharging the flow compressed by said fan, immediately downstream of said fan, with jet deflecting devices associated with each discharge nozzle and comprising, arranged immediately downstream of said nozzle, at least one upper deflecting segment pivoted about an axis substantially horizontal, substantially vertical lateral partitions, substantially horizontal lower grids provided with transverse blades and an operating device comprising a ring surrounding said nozzle, coupled by rods to the deflecting segments and actuated by longitudinal jacks.

References Cited in the file of this patent
UNITED STATES PATENTS

| | | |
|---|---|---|
| 2,912,188 | Singelmann | Nov. 10, 1959 |
| 2,975,593 | Bauger | Mar. 21, 1961 |
| 2,988,303 | Coanda | June 13, 1961 |